United States Patent [19]

Roseen

[11] Patent Number: 5,565,713
[45] Date of Patent: Oct. 15, 1996

[54] HIGH-VOLTAGE FILTER

[75] Inventor: Carl-Axel I. Roseen, Ludvika, Sweden

[73] Assignee: Asea Brown Boveri AB, Vasteras, Sweden

[21] Appl. No.: 329,287

[22] Filed: Oct. 26, 1994

[30] Foreign Application Priority Data

Nov. 19, 1993 [SE] Sweden .................................. 9303839

[51] Int. Cl.⁶ ................................ H02M 1/14; H02J 1/02
[52] U.S. Cl. .......................................... 307/105; 333/177
[58] Field of Search ................... 307/105; 333/177–180; 363/47, 39; 336/180, 198, 208

[56] References Cited

U.S. PATENT DOCUMENTS

| 4,939,486 | 7/1990 | Bergdahl et al. | 307/105 |
| 5,200,731 | 4/1993 | Tochio et al. | 336/198 |

FOREIGN PATENT DOCUMENTS 947177  7/1956  Germany ................................ 333/177

OTHER PUBLICATIONS

*Novel LC Filter Using Mutual Inductance*, J. Adashko, Nov. 25, 1959, Electronic Design, pp. 162–163.
*Parabolic Loci for Two Tuned Coupled Circuits*, S. Chang, Nov. 1948, Proceedings of the Institute of Radio Engineers, pp. 1384–1388.
*Theory and Operation of Tuned Radio–Frequency Coupling Systems*, Wheeler et al., May 18, 1931, Proceedings of the Institute of Radio Engineers, pp. 18–21, 35.
E.W. Kimbark, Direct Current Transmission vol. 1, 1971, pp. 363–367.
Adamson et al, High Voltage Direct Current Convertors and Systems, 1965, pp. 154 and 174.

*Primary Examiner*—William M. Shoop, Jr.
*Assistant Examiner*—Richard T. Elms
*Attorney, Agent, or Firm*—Watson Cole Stevens Davis, P.L.L.C.

[57] ABSTRACT

A high-voltage filter for filtering of harmonics in an electric power network comprises a first capacitive impedance element ($C_1$) arranged in a first electric circuit ($L_1$, $C_1$) and a second ($C_2$) capacitive impedance element arranged in a second electric circuit ($L_2$, $C_2$). The first and second electric circuits are inductively coupled to each other.

11 Claims, 3 Drawing Sheets

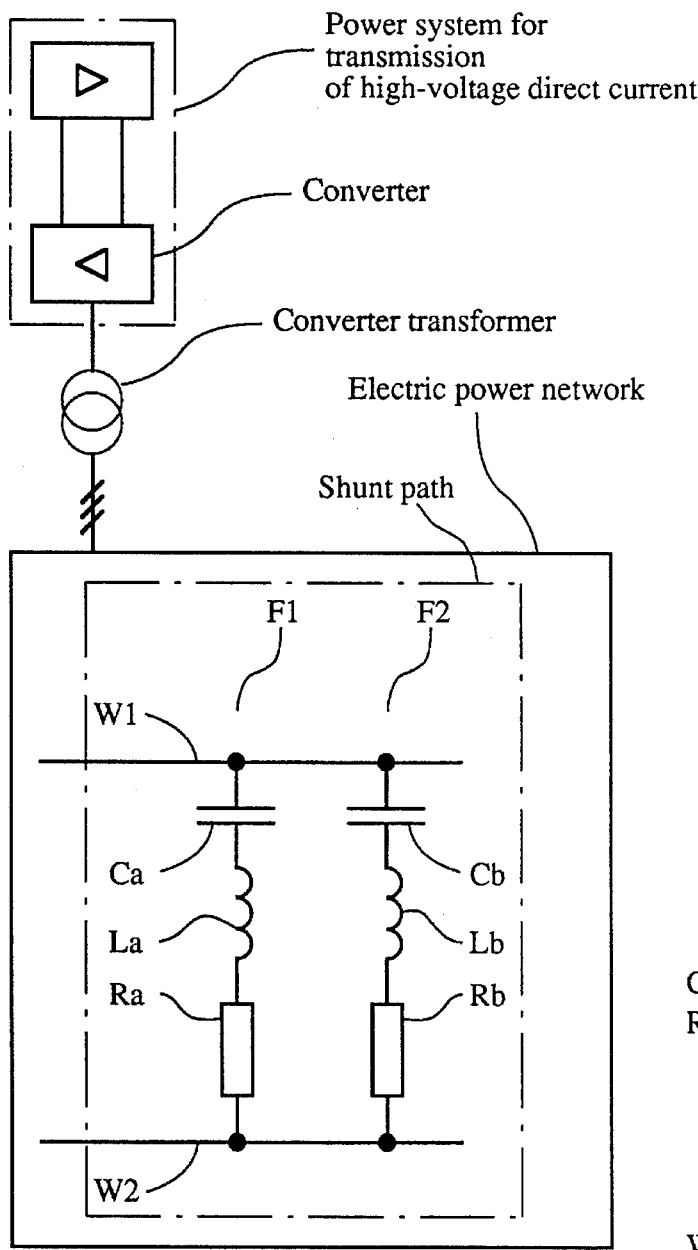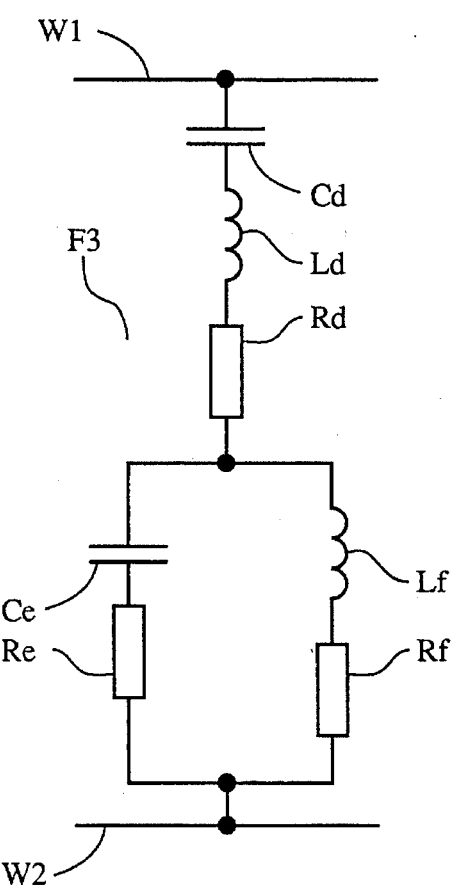
FIG 1
FIG 2

HIGH-VOLTAGE FILTER

TECHNICAL FIELD

The present invention relates to a high-voltage filter for filtering of harmonics in an electric power network, which filter comprises a first capacitive impedance element arranged in a first electric circuit and a second capacitive impedance element arranged in a second electric circuit.

The power network may, for example, consist of an a.c. network supplying a converter for transformation of alternating current into direct voltage in a power system for transmission of high-voltage direct current.

BACKGROUND ART

A converter connected to an a.c. network, for example a converter included in a converter plant for high-voltage direct current, generates, by its principle of operation, harmonic currents on its a.c. side and harmonic voltages on its d.c. voltage side. In this context, in principle, only harmonics to the fundamental frequency of the a.c. network of the orders $n=kp\pm 1$ occur on the a.c. side and of the orders $n=kp$ on the d.c. voltage side, p being the pulse number of the converter and k being a positive integer. Harmonics of other orders may also occur in power networks of this kind, caused by, for example, unsymmetries between the phases of the a.c. network.

To reduce the stresses on components included in the power network, and originating from the harmonics, and to fulfil the requirements made on the effect on the network and telecommunication disturbances, shunt-connected filters are therefore generally installed to limit the propagation of the disturbances in the power network. Harmonics of a lower order, for example those which correspond to $k=1$ and for 6-pulse converters also $k=2$, are generally filtered through filters tuned to these harmonics whereas harmonics of a higher order may be filtered through a high-pass filter. The filters are composed of passive components, and during the dimensioning it is also taken into consideration that the filters on the a.c. side are to serve as members for generating reactive power. In certain cases, it may be necessary to install tuned filters and high-pass filters also on the d.c. voltage side of the converter. In a converter plant for high-voltage direct current, these filters and the capacitor banks constitute plant components which considerably influence the function, volume and cost of the plant.

The tuned filters are generally designed as series-resonance circuits, comprising capacitive, inductive and sometimes also resistive impedance elements, so chosen that, at one or more of the harmonic frequencies expected in the power network, they are to exhibit a purely resistive impedance. These filters are connected between two conductors in the power network, of which one conductor may be galvanically connected to ground or consist of ground.

In, for example, 12-pulse converters, filters are usually installed on the a.c. side for filtering of at least the 11th and 13th tones. These filters may then be formed as two separate parallel-connected filters, each one essentially consisting of a series-connection of a capacitive, an inductive and a resistive impedance element. The filters are each tuned to one of the two above-mentioned tones, so-called single-tuned filters. Alternatively, the desired filtering may be achieved by means of a double-tuned filter tuned to both the 11th and 13th tones. In this way, the advantage is achieved, among other things, that only one capacitive impedance element need be dimensioned for full voltage stress. For a general discussion of this technical field, reference is made to E. W. Kimbark: *Direct Current Transmission*, John Wiley & Sons, Inc., 1971, in particular pages 363–367. For frequencies near the resonance frequencies, a double-tuned filter is substantially equivalent to two parallel-connected single-tuned filters. Relations for transformation of such a parallel connection of two single-tuned filters into a double-tuned filter are given, for example, in B. J. Cory (editor): *High Voltage Direct Current Convertors and Systems*, MacDonald & Co. Ltd., 1965, pages 154 and 174.

The above known configurations of double-tuned filters, however, exhibit certain drawbacks. The number of impedance elements remains large and comprises, inter alia, two inductive elements, between which magnetic coupling must be avoided. This means that the filter, at the site of the plant, requires relatively large ground space. The inductive impedance elements are not both located at any of the tapping points of the double-tuned filter. Further, the above-mentioned transformation method predetermines the impedance levels in the double-tuned filter, and therefore current and voltage utilization of the impedance elements therein cannot be freely optimized.

SUMMARY OF THE INVENTION

The object of the invention is to provide a filter of the kind stated in the introductory part of the description, which allows a more compact configuration of the filter and a more free dimensioning of the impedance elements included in the filter, and further makes possible that both of the inductive impedance elements included can be connected to ground potential.

According to the invention, the above object is achieved by designing the filter to comprise two electric circuits which are inductively coupled to each other.

Advantageous improvements of the invention will become clear from the following description and the appended claims.

BRIEF DESCRIPTION OF THE DRAWINGS

The invention will be explained in greater detail by description of embodiments with reference to the accompanying drawings, wherein FIG. 1 shows in the form of a circuit diagram two parallel-connected single-tuned filters according to the prior art, FIGS. 2 shows in the form of a circuit diagram a double-tuned filter according to the prior art.

DESCRIPTION OF THE PREFERRED EMBODIMENTS

FIG. 1 shows two single-tuned filters F1 and F2, connected between two electric conductors W1, W2. The conductor W1 may, for example, be a phase conductor in an electric three-phase network, supplying a 12-pulse converter for transformation of alternating current into direct voltage in a power system for transmission of high-voltage direct current. The conductor W2 may then be galvanically connected to ground for the three-phase network. The filter F1 comprises in a known manner a series-connection of one capacitive, one inductive, and one resistive impedance element, in the figure designated Ca, La and Ra, respectively. The impedance elements are so chosen that the filter exhibits resonance for the 11th tone to the fundamental frequency of the a.c. network. In the same way, the filter F2 comprises a series-connection of one capacitive, one inductive, and one resistive impedance element, in the figure designated Cb, Lb and Rb, respectively. In the filter F2, the impedance elements are so chosen that the filter exhibits resonance for the 13th tone to the fundamental frequency of the a.c. network. The two parallel-connected filters may in a known manner be replaced by a double-tuned filter F3 according to FIG. 2. The filter F3 comprises a series-connection of one capacitive, one inductive, and one resistive impedance element, designated Cd, Ld and Rd, respectively, and, in series therewith, a parallel connection of, on the one hand, a capacitive impedance element Ce in series with a resistive impedance element Re and, on the other hand, an inductive impedance element Lf in series with a resistive impedance element Rf. By selecting the impedance elements in the double-tuned filter according to the transformation rules described in the above-mentioned B. J. Cory: *High Voltage Direct Current Convertors and Systems*, for frequencies in the vicinity of, in this case, the 11th and 13th tones, the filter will exhibit substantially the same impedance as the two filters F1 and F2 in the parallel connection according to FIG. 1.

Figure 3A:
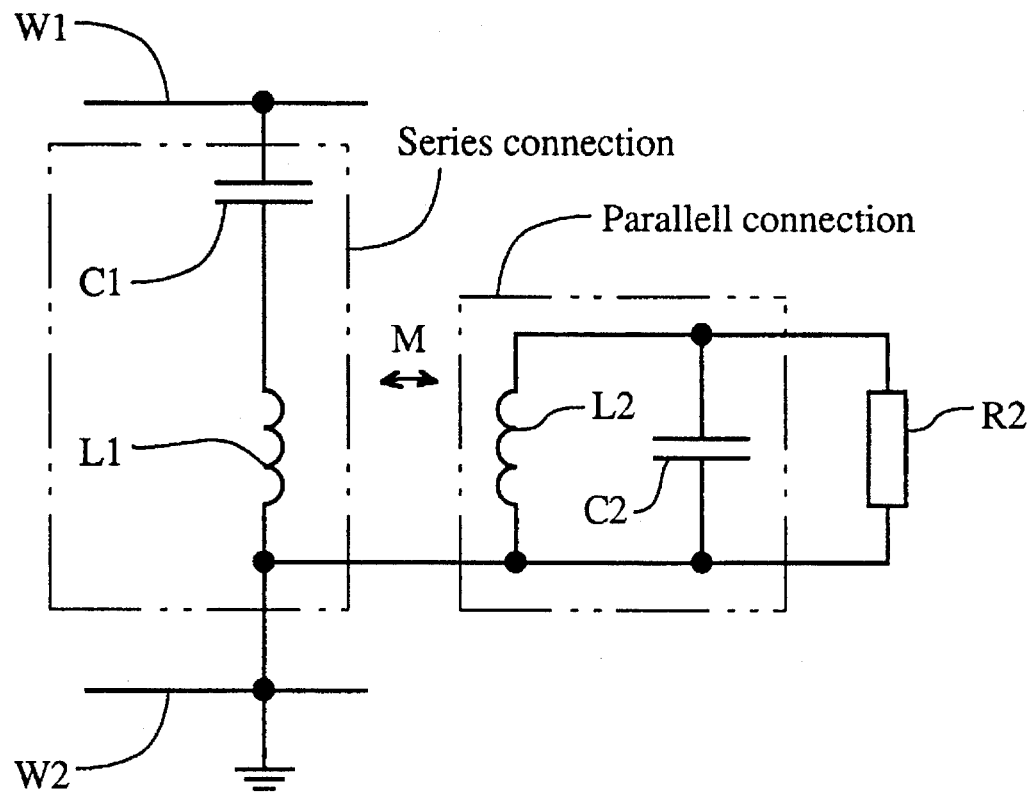
FIG. 3A shows in the form of a circuit diagram a double-tuned filter according to the invention.
Figure 3B:
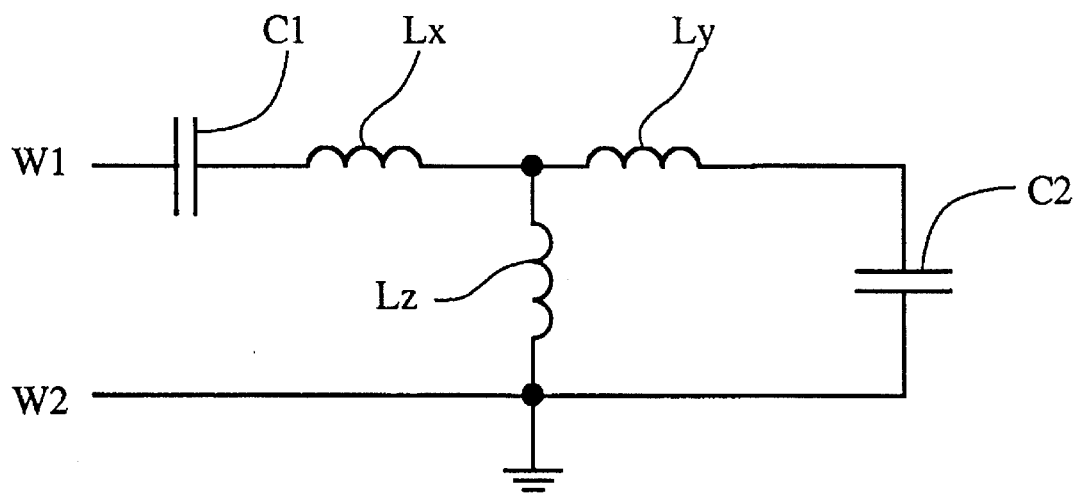
FIG. 3B shows in the form of a circuit diagram an equivalent circuit for a double-tuned filter according to FIG. 3A, and FIG. 4 schematically shows a physical embodiment of a filter according to FIG. 3A.

FIG. 3A shows a double-tuned filter F according to the invention. The filter comprises a first electric circuit which consists of a series connection of one capacitive impedance element C1 and one inductive impedance element L1, and a second circuit which consists of a parallel connection of one inductive impedance element L2, one capacitive impedance element C2 and one resistive impedance element R2. The first electric circuit is connected between two conductors W1 and W2 in the same way as filters F1 and F2 according to FIG. 1. At one terminal of the inductive impedance element L2, the second electric circuit is connected to the conductor W2 but is otherwise galvanically separated from the first electric circuit. Further, the inductive impedance elements are physically so located in relation to each other that an inductive coupling M exists between them, in the figure marked by a two-way arrow. An analysis of the circuit according to FIG. 3A, carried out with relationships known from the science of electricity, shows that, for the simplified case where the resistance of the resistive impedance element R2 is infinite, it may be replaced by an equivalent diagram according to FIG. 3B. The inductance values of the inductive impedance elements Lx, Ly and Lz in this equivalence diagram are then functions of the inductance values for the inductive impedance elements L1 and L2 and of the inductive coupling M therebetween. A further analysis and calculation of the equivalent diagram, carried out in a manner known per se, shows that by a suitable selection of the respective impedance element and of the inductive coupling M, a filter with a configuration according to FIG. 3A may be tuned to resonance at two selected frequencies, in this case the 11th and 13th tones to the fundamental frequency of the a.c. network.

Figure 4:
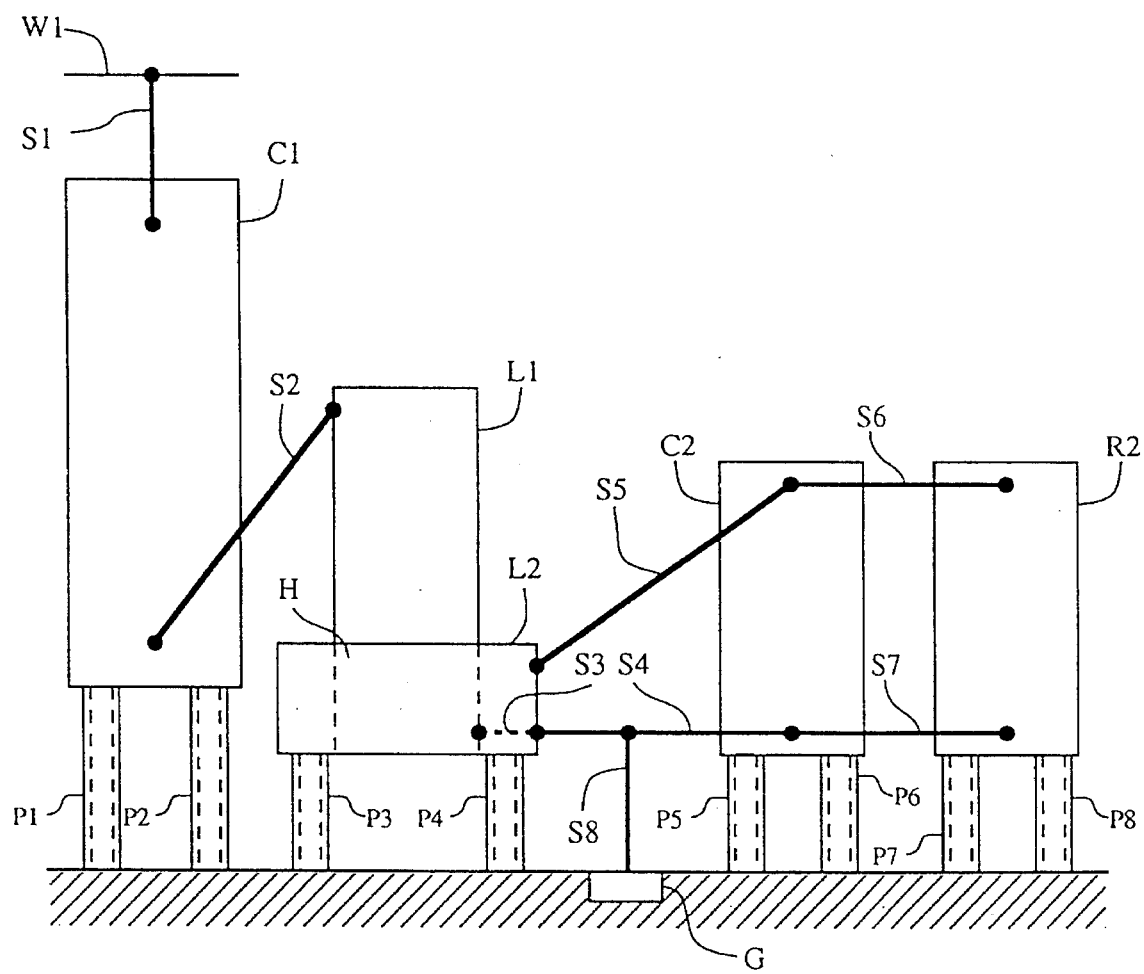

A physical embodiment of a filter according to FIG. 3 is shown in FIG. 4. The impedance elements C1, L1, L2, C2 and R2 are placed on support insulators P1–P8. A connecting conductor S1 connects one terminal of the impedance element C1 to the conductor W1, whereas the impedance elements of the filter are mutually connected via connecting conductors S1–S7. A connecting conductor S8 connects one terminal of each of the impedance elements L1 and L2 to a schematically shown ground electrode G.

The inductive impedance elements L1 and L2 may often advantageously be designed with such geometrical dimensions that the element L1 may be given a relatively narrow cross section whereas the element L2 may be given a relatively wide cross section and hence also be given a lower height than the element L1. In an advantageous embodiment, therefore, the impedance element L2 may be designed with a substantially centrally located cavity H and the inductive impedance element L1 be placed such that at least a part thereof is located in this cavity. In this way, the desired magnetic coupling is achieved in a simple manner and it can thus also be simply varied, for example by varying the mutual positions of the elements in a vertical direction.

In a conventional design of a double-tuned filter, it is essential that no magnetic coupling exists between the inductive impedance elements, whereas in an embodiment according to the invention this is a condition. From the plant point of view, the advantage is thus achieved that the physical dimensions of the filter become more compact and that both the inductive impedance elements may be placed on a common foundation, which results in savings of ground space and in design and assembly. To this is to be added that the internal drawing of wires and cables within the filter becomes simple, which also entails lower costs for the electric design and lower costs of installation at the site of the plant. With regard to the impedance elements included in the filter, the impedance level for the elements included in the second electric circuit may be chosen more freely than with a conventional design, and therefore these elements may be optimized with respect to current and voltage stresses. Both of the inductive impedance elements can be connected to ground, which is an advantage with regard to the voltage insulation of these elements.

The invention is not limited to the embodiments shown but a plurality of modification are feasible within the scope of the inventive concept. Although advantageous, it is not necessary for the second electric circuit to be galvanically connected to the conductor W2 and/or ground. The inductive impedance elements may be placed in relation to each other in other ways as long as the desired inductive coupling is maintained and this coupling may also be varied in other ways, known per se, for example by displacing cores in the elements. The filter according to the invention may, of course, also, where necessary, be applied to the d.c. side in a plant for transmission of high-voltage direct current.

I claim:

1. A high-voltage filter for connection between two conductors in an electric power network providing a shunt path for harmonics carried by said two conductors and which harmonics are generated by a converter, connected to said power network, for transformation of alternating current of a fundamental frequency into direct voltage in a power system for transmission of high-voltage direct current, said filter comprising:

a first capacitive impedance element arranged in a first electric circuit; and a second capacitive impedance element arranged in a second electric circuit, said first electric circuit having first and second terminals for connection one each, to said two conductors and said second electric circuit inductively coupled to said first electric circuit and galvanically connected to one of said first and second terminals;

said filter tuned to resonance at two selected frequencies both of which are higher than said fundamental frequency.

2. A high-voltage filter according to claim 1, wherein the filter is tuned to resonance at two selected frequencies both of which are at least four times higher than the fundamental frequency.

3. A high-voltage filter according to claim 1, wherein the first electric circuit comprises a series connection of the first capacitive impedance element and an inductive impedance element between said first and second terminals and the second electric circuit comprises a parallel connection of the second capacitive impedance element and an inductive impedance element connected to the second terminal.

4. A high-voltage filter according to claim 1, wherein the second terminal comprises a ground terminal.

5. A high-voltage filter according to claim 2, wherein the first and the second electric circuits are inductively coupled to each other via the inductive impedance elements.

6. A high-voltage filter according to claim 2, wherein one of the inductive impedance elements has a cavity and a portion of the other of the inductive impedance element located in the cavity.

7. A high-voltage double-tuned filter for connection across a pair of first and second conductors in an electric power network for shunt by-passing harmonics produced by conversion of AC electric power at a fundamental frequency to DC electric power, comprising:

a first and second terminal for connection to one each to the first and second conductors respectively;

a first reactive circuit including a first capacitive impedance element and a first inductive impedance element coupled between the first and second terminals; and a second reactive circuit including a second capacitive impedance element and a second inductive impedance element coupled to the second terminal, and wherein the first and the second inductive impedance elements are disposed for inductively coupling the first and second reactive circuits to each other.

8. The high-voltage filter according to claim 7, wherein the first reactive circuit comprises a series connection of the first capacitive impedance element and the first inductive impedance element and the second reactive circuit comprises a parallel connection of the second capacitive impedance element and the second inductive impedance element.

9. The high-voltage filter according to claim 7, wherein the second reactive circuit includes a ground connection.

10. The high-voltage filter according to claim 7, wherein one of the inductive impedance elements is formed with a cavity and for receiving therein a portion of the other of the other inductive impedance elements.

11. A high-voltage filter according to claim 7, wherein the filter is tuned to resonance at two selected frequencies both of which are at least four times higher than the fundamental frequency.

* * * * *